United States Patent
Yang et al.

(10) Patent No.: US 7,860,157 B2
(45) Date of Patent: Dec. 28, 2010

(54) MOBILE RECEIVER EQUALIZER STRUCTURE FOR USE IN THE ATSC STANDARD

(75) Inventors: Lin Yang, Fremont, CA (US); Qin Liu, Fremont, CA (US)

(73) Assignee: Legend Silicon Corp., Fremont, CA (US)

( * ) Notice: Subject to any disclaimer, the term of this patent is extended or adjusted under 35 U.S.C. 154(b) by 669 days.

(21) Appl. No.: 11/876,368

(22) Filed: Oct. 22, 2007

(65) Prior Publication Data

US 2009/0103600 A1    Apr. 23, 2009

(51) Int. Cl.
*H03H 7/30* (2006.01)
(52) U.S. Cl. .......................... 375/233; 375/231
(58) Field of Classification Search .......... 375/229–235
See application file for complete search history.

(56) References Cited

U.S. PATENT DOCUMENTS

| | | | | |
|---|---|---|---|---|
| 6,411,649 B1 * | 6/2002 | Arslan et al. | ................ | 375/232 |
| 7,242,732 B2 * | 7/2007 | Ojard et al. | ................. | 375/355 |
| 2001/0004390 A1 * | 6/2001 | Pukkila et al. | .............. | 375/340 |
| 2005/0259770 A1 * | 11/2005 | Chen | .......................... | 375/346 |
| 2006/0034352 A1 * | 2/2006 | Sampath et al. | ............. | 375/148 |
| 2007/0104264 A1 * | 5/2007 | Park et al. | .................... | 375/233 |
| 2007/0223563 A1 * | 9/2007 | Perlow et al. | ............... | 375/130 |
| 2008/0049600 A1 * | 2/2008 | Liu | ............................ | 370/208 |
| 2009/0028234 A1 * | 1/2009 | Zhu | ........................... | 375/233 |
| 2009/0052516 A1 * | 2/2009 | Chen et al. | .................. | 375/232 |

* cited by examiner

*Primary Examiner*—Emmanuel Bayard
(74) *Attorney, Agent, or Firm*—Frank F. Tian

(57) ABSTRACT

A circuit structure has a channel estimator adapted to receive an input, an equalizer adapted to receive the input and generate an equalized output, and an equalizer training block adapted to receive estimated channel condition information, and provide a set of trained coefficients to the equalizer. The equalized output is used by the channel estimator for at least one subsequent channel estimation. The channel estimator, the equalizer, and the equalizer training block are looped together.

10 Claims, 4 Drawing Sheets

MOBILE RECEIVER EQUALIZER STRUCTURE FOR USE IN THE ATSC STANDARD

CROSS-REFERENCE TO OTHER APPLICATIONS

The following applications of common assignee are related to the present application, and are hereby incorporated herein by reference in their entireties:

U.S. patent application Ser. No. 11/687,689 to YANG, et al entitled "METHOD AND APPARATUS FOR CHANNEL INTERPOLATION IN A TDS-OFDM SYSTEM OR DVB T/H SYSTEM".

U.S. patent application Ser. No. 11/687,693 to YANG, et al entitled "METHOD AND APPARATUS FOR ROBUST FREQUENCY EQUALIZATION".

FIELD OF THE INVENTION

The present invention relates generally to communication devices or receivers. More specifically, the present invention relates to a mobile receiver equalizer structure for use in a digital television (DTV) standard such as the ATSC standard.

BACKGROUND

Digital receivers such as DTV receivers requires channel estimation for later processing. In addition, digital receivers are known to use an equalizer such as decision-feedback equalizers (DFE). The use of DFE in digital demodulation is known.

However, DFE equalization is not suitable for enabling the initial acquisition of digital modulation that is severely distorted by multipath-induced intersymbol interference. Therefore, a reference waveform or reference sequence is typically introduced.

In the United States, an 8-level vestigial sideband modulation (8-VSB) is proposed for the terrestrial broadcast of digital television transmission by the Advanced Television Systems Committee ATSC. The 8-level vestigial sideband modulation is a special single carrier technique. As in most wireless transmission, multipath propagation is one of the major challenging problems in VSB signal transmission. Multipath propagation degrades the receiver performance by introducing inter-symbol interference (ISI). Often, time-domain decision-feedback equalization (DFE) is required. U.S. Pat. No. 7,230,983 to Yousef describes a DFE means for determine coefficients of a decision feedback equalizer from a sparse channel estimate. However, the result of the equalization is not used for later channel estimation purposes.

U.S. Pat. No. 5,886,748 to Lee describes an Equalizing method and equalizer using reference signal. However, the cited work does not address the multipath issues relevant to ATSC DTV reception.

In summary, previous work concentrates on continuous adaptive DFE and is not suited for mobile application. For a receiver in a mobile context such a moving automobile, channel conditions may change at a rate greater than that of a non-mobile context. Therefore, it is desirous to have a mobile receiver equalizer structure that possesses an improved means for modeling channel conditions.

SUMMARY OF THE INVENTION

An improved equalizer structure for modeling channel conditions is provided.

A mobile receiver having an improved equalizer structure for modeling channel conditions is provided.

A receiving device is provided that comprises: a channel estimator adapted to receive an input; and an equalizer adapted to receive the input and generate an equalized output, wherein the equalized output is used by the channel estimator for at least one subsequent channel estimation.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
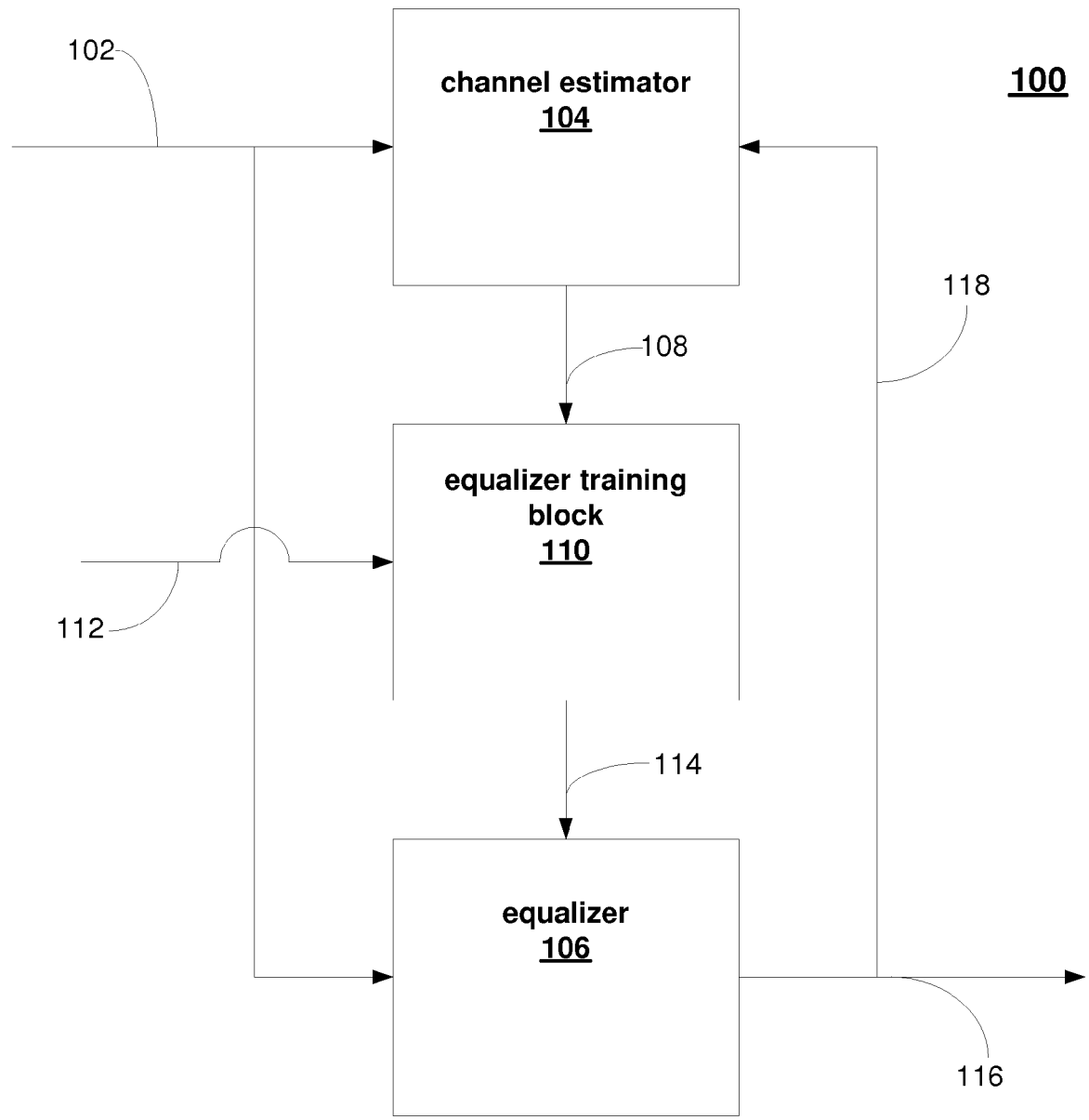
FIG. 1 is an example of a receiver in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to simultaneously use a set of coefficient for equalizing and training, as well as feeding back the equalized output to the channel estimator. Furthermore, instead of using both shuffle-in/shuffle-out circuitry associated with each row updating, only a modified shuffle-in circuitry is used, and the shuffle-out circuitry is eliminated. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of relating to simultaneously use a set of coefficient for equalizing and training, as well as feeding back the equalized output to the channel estimator. In the exemplified embodiments, it is noted that the processors include Finite State Machines, which are used in the preferred embodiment. The non-processor circuits may include, but are not limited to, a radio receiver, a radio transmitter, signal drivers, clock circuits, power source circuits, and user input devices. As such, these functions may be interpreted as steps of a method with reduced memory requirements to perform simultaneously use a set of coefficient for equalizing and training, as well as feeding back the equalized output to the channel estimator. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIGS. 1-4, depictions of the present invention are shown. In FIG. 1, received signal 102 coupled to an antenna (not shown) is fed to both a channel estimator 104 and a equalizer 106. In channel estimator 104, the estimated channel information h is generated and fed into an equalizer training block 110. Further, a local pseudo noise (PN) sequence 112 is used as the training sequence for equalizer training block 110. Equalizer training block 110 generates a set of coefficient a set of trained coefficient 114 that is used both for internal training and for equalizer 106. At equalizer 106, the equalized information is both used as output 116 and fed back 118 to channel estimator 104 as a reference for future channel estimation. It is noted that channel estimator 104 operates in one or a combination of ways described in the various patent applications to the same inventors, all of which are listed herein the document and are hereby incorporated herein by reference.

An exemplified internal operation for channel estimator 104 is disclosed in U.S. Pat. No. 7,170,944 to Liu et al entitled "ITERATIVE ASSESSMENT OF MULTIPATH SIGNAL PRESENCE", wherein a method and system disclosed for determining whether one or more multipath signals is present in a received signal frame that includes a reference symbol (RS) sequence as part of the frame, and for iteratively evaluating a multipath signal that is present. The RS sequence index (m1) for the frame is identified, and first and second Fourier transforms for the received frame are provided for a selected time segment IS that includes the RS sequence of the received frame. An inverse Fourier transform of the ratio of the transforms is computed and analyzed. If at least one multipath signal is present, the inverse Fourier transformed information is nonlinearly filtered, and the filtered function is convolved with the reference symbol (RS) sequence. This convolution represents a received signal extension, due to multipath signal(s) presence. A refinement procedure analyzes a contribution to multipath signals from the preceding frame(s). The procedure is iteratively driven toward an optimal representation of any multipath signal(s) present.

Figure 2:
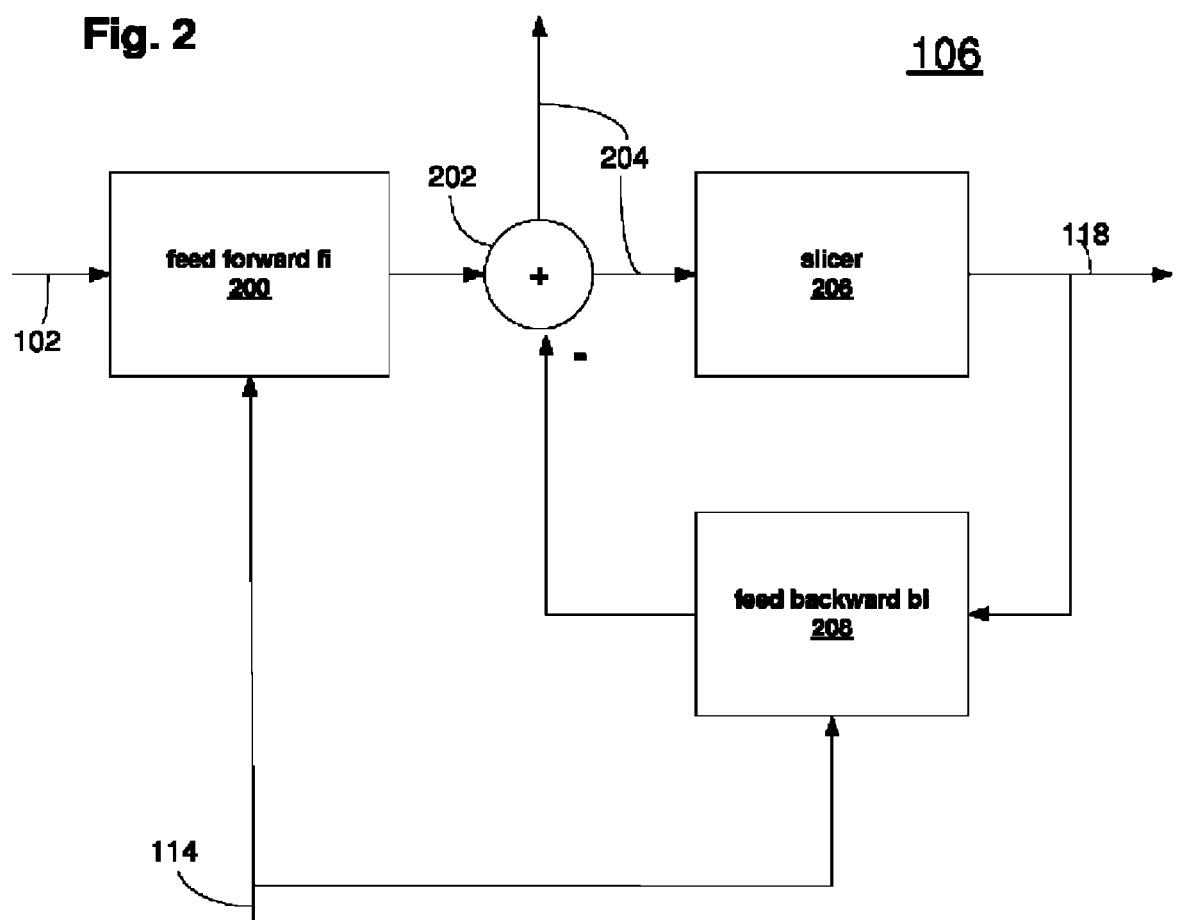
FIG. 2 is an example of a first detailed part of FIG. 1.

In FIG. 2, a detailed depiction of equalizer 106 is shown. Received signal 102 along with a set of trained coefficients 114 feed into block 200 in which a feed forward coefficient $f_i$ is selected. The set of trained coefficients 114 is also fed into feed backward coefficient block 208 in which a feed backward coefficient $b_i$ is selected. The subscript i herein is a positive integer for both $f_i$ and $b_i$ that ranges between 1 to n and spans a time segment. Block 200 receives signal 102 and filters it with the feed-forward equalization coefficients fi. The feed-backward equalizer 208 filters signal 118 based on the feed-backward coefficients bi. The subtraction module 202 subtracts the feedback equalized signal from the feed-forward equalized signal to produce a equalized signal 204. The 204 is further refined by a slicer 206, wherein more accurate information is obtained. The sliced information is further fed back to channel estimator 104 via fed back line 118. Further, sliced information is also fed to feed backward coefficient 208.

Figure 3:
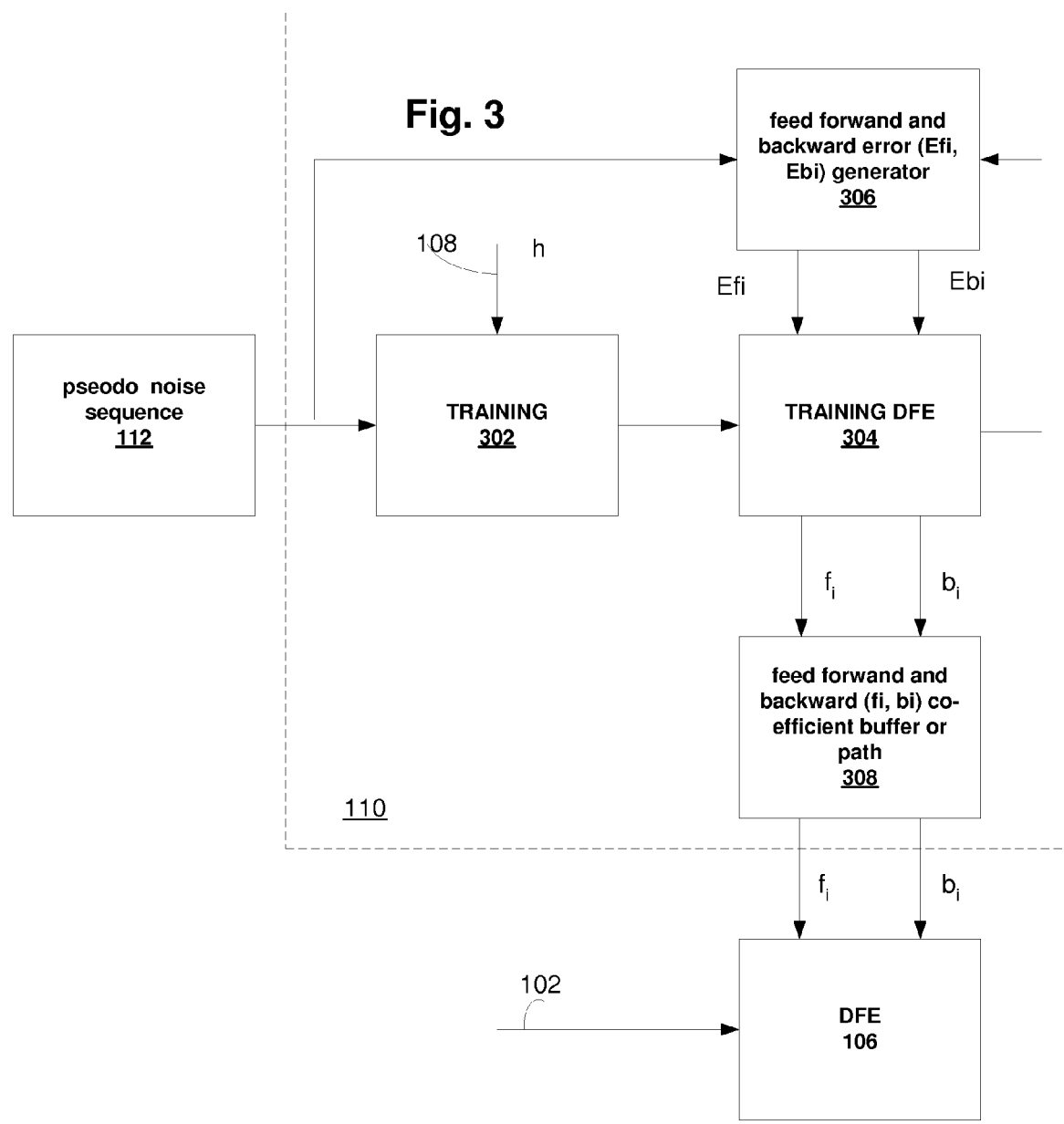
FIG. 3 is an example of a second detailed part of FIG. 1.

In FIG. 3, a depiction 300 of equalizer training block 110 with other elements is shown. Equalizer training block 110 comprises a training block 302, a training decision feedback equalizer (DFE) 304, and a feed forward and feed backward coefficient error generator 306. The generated errors Efi and Ebi are fed into training DFE 304 for updating of $f_i$ and $b_i$. Estimated channel condition 108 is fed into a training block 302, wherein together with training sequence 112 are used as inputs into training DFE 304, wherein suitable $f_i$ and $b_i$ are updated. The coefficients of training DFE 304 is fed into EFE 106, wherein a set of trained coefficients 114 such as $f_i$ and $b_i$ are used for equalization purposes. Further, feed forward and feed backward coefficient error generator 306 also uses training sequence 112 to generate $f_i$ and $b_i$. The generated $f_i$ and $b_i$ are first stored in a buffer or path and then used by equalizer 106, which comprises a second DFE having received signal 102 as input. Equalizer 106 may comprise a feed forward DFE and a feed backward DFE (both not shown). Similarly, training DFE 304 may comprise a feed forward DFE and a feed backward DFE (both also not shown). As can be seen, in this invention, channel estimation, DFE training, and DFE are combined and looped together to form a new structure.

Figure 4:
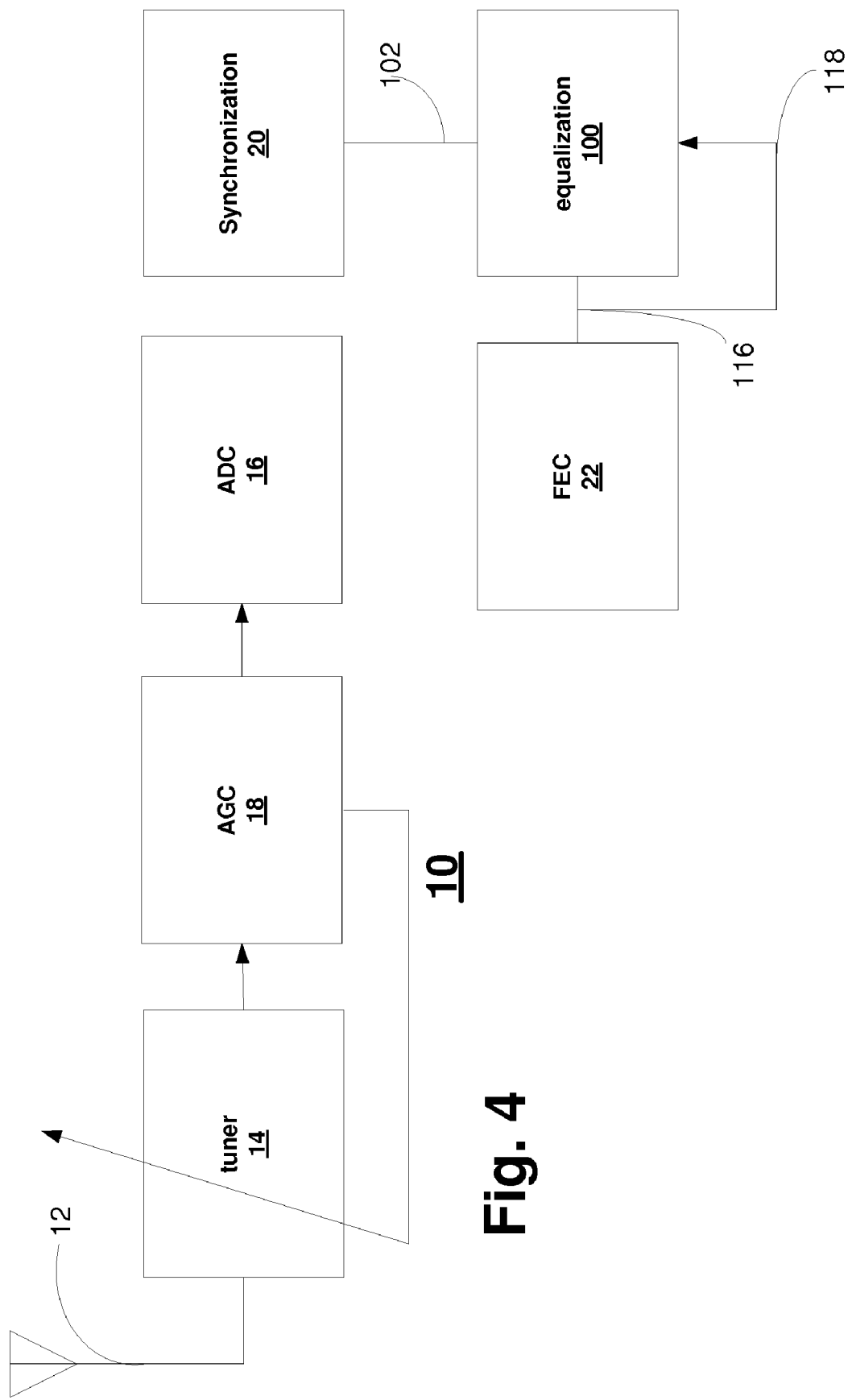
FIG. 4 is an example of a receiver in accordance with some embodiments of the invention.

FIG. 4, an exemplified receiver 10 suitable for implementing the equalization structure of FIG. 1 is shown. Analog RF signal is received wirelessly via antenna 12 and fed into a front end including a tuner 14 and an analog-to-digital converter (ADC) 16, and an automatic gain control unit 18. Within tuner 14 the analog RF signal is converted to baseband and adjusted by automatic gain control unit 18. ADC 16 transforms the received analog signals into a digital signal. An automatic gain control unit 18 is used for maintaining the strength of signals coming from antenna 12 via tuner 14.

The transformed signal undergoes synchronization 20. The synchronized digital information 102 undergoes equalization 100 as described in FIGS. 1-3. The equalized information 116 is further subjected to forward error control (FEC) 22. In addition, equalized information 116 is also fed back 118 to equalization block 100 for subsequent processing.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A device comprising:
 a channel estimator adapted to receive an input;
 an equalizer adapted to receive the input and generate an equalized output, wherein the equalized output is fed back to the channel estimator for at least one subsequent channel estimation; and
 an equalizer training block adapted to receive estimated channel condition information, and provide a set of trained coefficients to the equalizer;
 wherein the channel estimator, the equalizer, and the equalizer training block are looped together.

2. The device of claim 1, wherein the equalizer training block is adapted to receive a training sequence.

3. The device of claim 1, wherein the equalizer comprises decision-feedback equalizers (DFE).

4. The device of claim 1, wherein the equalizer training block comprises coefficient generator generating the set of trained coefficients to the equalizer.

5. The device of claim 1, wherein the device is a digital receiver.

6. The device of claim 1, wherein the channel estimator, the equalizer, and the equalizer training block are looped together to form a circuit structure.

7. A circuit structure comprising:
 a channel estimator adapted to receive an input;
 an equalizer adapted to receive the input and generate an equalized output, wherein the equalized output is fed back to the channel estimator for at least one subsequent channel estimation; and
 an equalizer training block adapted to receive estimated channel condition information, and provide a set of trained coefficients to the equalizer;
 wherein the channel estimator, the equalizer, and the equalizer training block are looped together.

8. The circuit structure of claim 7, wherein the equalizer training block is adapted to receive a training sequence.

9. The circuit structure of claim 7, wherein the equalizer comprises decision-feedback equalizers (DFE).

10. The circuit structure of claim 7, wherein the equalizer training block comprises coefficient generator generating the set of trained coefficients to the equalizer.

* * * * *